(12) United States Patent
Bernhard et al.

(10) Patent No.: US 12,115,509 B2
(45) Date of Patent: Oct. 15, 2024

(54) NON-INVASIVE MONITORING OF A MIXING PROCESS IN A CONTAINER

(71) Applicant: ABB Schweiz AG, Baden (CH)

(72) Inventors: Christof Bernhard, Aarau (CH); Frank Kassubek, Rheinfelden (DE); Miklos Lenner, Daettwil (CH); Detlef Pape, Nussbaumen (CH)

(73) Assignee: ABB Schweiz AG, Baden (CH)

( * ) Notice: Subject to any disclaimer, the term of this patent is extended or adjusted under 35 U.S.C. 154(b) by 871 days.

(21) Appl. No.: 17/209,263

(22) Filed: Mar. 23, 2021

(65) Prior Publication Data

US 2021/0205772 A1    Jul. 8, 2021

Related U.S. Application Data

(63) Continuation of application No. PCT/EP2019/073540, filed on Sep. 4, 2019.

(30) Foreign Application Priority Data

Sep. 26, 2018  (EP) ..................... 18196862

(51) Int. Cl.
*B01F 35/213* (2022.01)
*B01F 35/22* (2022.01)
(Continued)

(52) U.S. Cl.
CPC ........ *B01F 35/213* (2022.01); *B01F 35/2208* (2022.01); *G01N 29/024* (2013.01);
(Continued)

(58) Field of Classification Search
CPC . B01F 35/213; B01F 35/2208; G01N 29/024; G01N 29/032; G01N 29/46;
(Continued)

(56) References Cited

U.S. PATENT DOCUMENTS 5,060,507 A    10/1991  Urmson et al.
5,476,096 A    12/1995  Olstad et al.
(Continued)

FOREIGN PATENT DOCUMENTS

CN    101762639 A    6/2010
DE    102007056543 A1    5/2009
(Continued)

*Primary Examiner* — Peter J Macchiarolo
*Assistant Examiner* — John M Royston
(74) *Attorney, Agent, or Firm* — Leydig, Voit & Mayer, Ltd.

(57) ABSTRACT

A method of determining a mixing state of a medium in a container includes: transmitting a plurality of acoustic signals at least partly through the medium and receiving the plurality of acoustic signals after at least partly traversing the medium; determining at least one propagation value of at least one propagation quantity for each of the plurality of received acoustic signals to provide determined propagation values, each at least one propagation quantity being indicative of an interaction of the acoustic signals with the medium; determining at least one fluctuation value of at least one fluctuation quantity based on the determined propagation values to provide a determined at least one fluctuation value, each at least one fluctuation quantity being indicative of and/or correlating with a variance of the determined propagation values and/or with a state of a mixture; and determining the mixing state of the medium.

14 Claims, 2 Drawing Sheets

(51) Int. Cl.
*G01N 29/024* (2006.01)
*G01N 29/032* (2006.01)
*G01N 29/46* (2006.01)

(52) U.S. Cl.
CPC ........... *G01N 29/032* (2013.01); *G01N 29/46* (2013.01); *G01N 2291/011* (2013.01); *G01N 2291/015* (2013.01); *G01N 2291/02416* (2013.01)

(58) Field of Classification Search
CPC ....... G01N 2291/011; G01N 2291/015; G01N 2291/02416; G01N 2291/0222; G01N 2291/0224; G01N 2291/024; G01N 2291/025; G01N 29/44
See application file for complete search history.

(56) References Cited

U.S. PATENT DOCUMENTS

| | | |
|---|---|---|
| 6,460,402 B1 | 10/2002 | Gomm et al. |
| 2003/0051535 A1 | 3/2003 | Coupland et al. |
| 2003/0097068 A1 | 5/2003 | Hossack et al. |
| 2004/0182138 A1 | 9/2004 | Greenwood et al. |
| 2008/0188750 A1 | 8/2008 | Randall et al. |
| 2015/0045666 A1 | 2/2015 | Lin |
| 2015/0308869 A1* | 10/2015 | Black ................... G01N 29/036 |
| | | 73/861.04 |
| 2015/0354343 A1 | 12/2015 | Wroblewski et al. |
| 2016/0369624 A1* | 12/2016 | Ahmad ................... G01F 1/666 |
| 2017/0000940 A1 | 1/2017 | Schultz et al. |

FOREIGN PATENT DOCUMENTS

| | | |
|---|---|---|
| DE | 102015117441 A1 | 4/2017 |
| EP | 1003051 A2 | 5/2000 |
| GB | 2040453 A1 | 8/1980 |
| JP | 2000-39425 A | 2/2000 |
| WO | WO 2012176101 A1 | 12/2012 |
| WO | wo 2017055551 A1 | 4/2017 |

* cited by examiner

NON-INVASIVE MONITORING OF A MIXING PROCESS IN A CONTAINER

CROSS-REFERENCE TO PRIOR APPLICATION

This application is a continuation of International Patent Application No. PCT/EP2019/073540, filed on Sep. 4, 2019, which claims priority to European Patent Application No. EP 18196862.9, filed on Sep. 26, 2018. The entire disclosure of both applications is hereby incorporated by reference herein.

FIELD

Generally, the present invention relates to the field of process automation, e.g. in process industry. Particularly, the invention relates to a method of determining a mixing state and/or monitoring of a mixing process of media in a container based on acoustic technology. The term "container" is used here and throughout this document in a broad sense, not being limited to a closed container, but also including containers that are at least partly open, and also including tubes or plumbing or pipelines that are configured to contain or guide any kind of media, such as liquids, liquefied solids or gases of all kinds.

The invention further relates to a program element, a computer readable medium, and to a measurement system configured to perform such method.

BACKGROUND

In process industry and/or process automation, a comprehensive control and optimization of mixing processes may be desirable. A typical mixing process in process industry is, for example, the mixing of two fluids in a tank and/or container. Such mixing process may comprise e.g. a single-phase liquid mixing or a mixing of immiscible liquids, for instance to create an emulsion. Controlling and optimizing such mixing process may be advantageous in order to reduce time and/or energy costs. Furthermore, at least in some cases, excessive mixing may be harmful to the product or medium that is mixed, e.g. for bio-materials where cells can be destroyed by too much agitation or for polymeric solutions where rheological properties can change.

A typical setup for mixing of fluids, liquids and/or media are mechanically agitated vessels. Usually, such vessels comprise a tank and/or container, often a vertical cylindrical container with one or more impellers and possibly baffles to improve mixing.

In such a container, however, a state of the medium and/or a mixing state of the medium is hardly determinable. Specifically, it might be desirable to determine whether one or more components of the medium, such as e.g. two different fluids, are already sufficiently mixed, i.e. whether the medium in the container is sufficiently homogenous. Also, it might be desirable to determine whether the mixing process can be stopped, or whether the medium is still inhomogeneous so that the mixing process should be extended. Particularly, it might be desirable to determine the mixing state of the medium without opening the container and/or without interfering with the mixing process itself.

Further, during mixing of a medium, chemical reactions can occur in the container, which can change certain characteristics of the medium. For such cases, it might be desirable to determine whether the reaction between constituents of the medium has already happened. This may be particularly desirable e.g. in the production of polymers and/or polymer-based materials.

SUMMARY

In an embodiment, the present invention provides a method of determining a mixing state of a medium in a container, the method comprising the steps of: transmitting a plurality of acoustic signals at least partly through the medium and receiving the plurality of acoustic signals after at least partly traversing the medium; determining at least one propagation value of at least one propagation quantity for each of the plurality of received acoustic signals to provide determined propagation values, each at least one propagation quantity being indicative of an interaction of the acoustic signals with the medium; determining at least one fluctuation value of at least one fluctuation quantity based on the determined propagation values to provide a determined at least one fluctuation value, each at least one fluctuation quantity being indicative of and/or correlating with a variance of the determined propagation values and/or with a state of a mixture; and determining the mixing state of the medium based on the determined at least one fluctuation value, the mixing state being indicative of a homogeneity the medium.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides an improved method and a corresponding measurement system for determining a mixing state and/or monitoring a mixing process of a medium in a container, particularly in a non-invasive manner.

It should be noted that the following described aspects of the invention equally apply to the method of determining a mixing state of a medium in a container, the program element, the computer-readable medium and the measurement system.

In an embodiment, the present invention provides a method of determining a mixing state and/or of monitoring a mixing process of a medium in a container. The method comprises the following steps:

transmitting and/or emitting, e.g. by one or more ultrasound devices of a measurement system, a plurality of ultrasound signals at least partly through the medium and receiving the plurality of ultrasound signals after at least partly traversing the medium;

determining, calculating and/or computing, e.g. by a controller of the measurement system, at least one propagation value of at least one propagation quantity for each of the plurality of received ultrasound signals, wherein the propagation quantity is indicative and/or representative of an interaction of the ultrasound signals with the medium;

determining, calculating and/or computing, e.g. by the controller, at least one fluctuation value of at least one fluctuation quantity based on the determined propagation values, wherein the at least one fluctuation quantity is indicative of and/or correlates with a variance of the determined propagation values; and determining a mixing state of the medium based on the determined at least one fluctuation value, wherein the mixing state is indicative of a homogeneity of the medium.

Generally, using acoustic, for example ultrasound, signals, which may be emitted and/or received by one or more acoustic, for example ultrasound, devices, ultrasound transmitters and/or ultrasound transducers that may be arranged on an outer wall and/or an inner wall of the container, advantageously allows one to determine the mixing state, the homogeneity and/or the inhomogeneity of the medium with high accuracy and precision without interfering with the medium, without affecting physical and/or chemical characteristics and/or without affecting the mixing process of the medium. The term transmitter shall be understood to be also a synonym for emitter. The term transducer shall be understood to mean a device or an element combining an emitter and a receiver in one device. Accordingly, the invention allows one to monitor a mixing process in the container and/or in a tank, e.g. in process industry, in a non-invasive and/or non-intrusive manner, particularly without opening the container and/or without interrupting the mixing process.

In process industry, mixers and/or impellers are usually operated for a certain period of time that may be set generously to ensure and/or achieve sufficient mixing of the medium under all conditions, such as e.g. at different temperatures of the medium or the like. Accordingly, in conventional approaches, the medium is usually mixed and/or stirred for a pre-determined period of time that may be longer than required to achieve a sufficient mixing and/or homogeneity of the medium, as in such conventional approaches no measurement, particularly no online measurement, of the mixing state is made.

In contrast thereto, the present invention allows one to determine the mixing state based on the at least one fluctuation value. Hence, by means of the inventive method, the mixing process can be stopped at a desired point in time, could be later or earlier, compared to conventional approaches, as the mixing state and/or the homogeneity (or a level of homogeneity) of the medium can be monitored, e.g. online during the mixing process. This may advantageously save time and/or reduce production costs. Also, excessive mixing of media and/or substances that may be affected in their physical and/or chemical characteristics, such as e.g. bio-materials and/or polymers, may advantageously be avoided by means of the invention method.

The medium may, for example, refer to a mixture of at least two components, substances, constituents and/or materials. Generally, the medium and/or one or more components thereof may be fluids, liquids, gases and/or solid materials or liquefied solids or solid-fluid mixtures such as for example suspensions, sols, solid foams and the like. Also, the at least two components may differ in phase, e.g. one component may be a fluid, whereas the other one may be a solid material.

In the context of the present disclosure, the at least one fluctuation value of the at least one fluctuation quantity correlating with the variance or another statistical property of the determined propagation values may refer to and/or may be used as an indicator and/or a signature for the mixing state and/or for a level of homogeneity (or inhomogeneity) of the medium. Optionally, however, the step of determining the mixing state may comprise determining a value of a mixing quantity indicative of a level of homogeneity of the medium, wherein the value of the mixing quantity may be derived from the at least one fluctuation value.

Re-phrasing the first aspect, a plurality, i.e. at least two, ultrasound signals may be transmitted at least partly through the medium and received, e.g. by one or more ultrasound devices of the measurement system. In other words, practically, it is sufficient to emit only one signal, which generates a plurality of signals during propagation/transmission through the media. By way of example, at least one ultrasound device may comprise at least one ultrasound emitter (and/or ultrasound sender) emitting one or more ultrasound signals and at least one ultrasound receiver receiving the one or more ultrasound signals, wherein the at least one emitter and the at least one receiver may be arranged on opposite sides of the container. Alternatively or additionally, at least one ultrasound device may be configured to emit one or more ultrasound signals, wherein the at least one ultrasound device may be configured to receive one or more ultrasound signals after reflection on a wall of the container. For example, a controller may be coupled to the one or more ultrasound devices, wherein the controller may be configured to control the one or more ultrasound devices and/or trigger transmission of the ultrasound signals, e.g. by providing a respective control signal to the one or more ultrasound devices. The controller may be configured to determine the propagation value for each of the at least two ultrasound signals. Further, the controller may be configured to calculate and/or compute the at least one fluctuation value of the at least one fluctuation quantity over mixing time based on the least two determined propagation values.

In other words: a) there is a variance over time, due to the motion and inhomogeneity; b) there is a spatial variance, which can be measured with multiple paths; c) there is the possibility to correlate also different signals, as time of arrival and amplitude and their change. Both a) and b) can be combined to form the "fluctuation values" that are referred to here. Especially for a), more complex statistical variances might be of interest to use, as one can use the—expected-timescale for forming these values. For b), the correlation between the signals might be of interest. Of course, a) and b) could as an example also be combined to even more complex "fluctuation quantities".

It should be noted that if more than two ultrasound signals are transmitted and/or received, the propagation values may be determined for at least two and/or for at least a subset of the plurality of ultrasound signals. Further, the at least one fluctuation value may be calculated and/or determined based on least a subset of the determined propagation values, e.g.

based on the at least two determined propagation values, as determined for the at least two of the plurality of ultrasound signals.

According to an embodiment, the step of determining the at least one propagation value for each of the plurality of received ultrasound signals can comprise determining a propagation time for each of the plurality of ultrasound signals, the propagation time being indicative of a time-of-flight of the respective ultrasound signal through the medium. Therein, the propagation time of each of the ultrasound signals may be defined as the time between emission of an ultrasound signal and reception of the respective ultrasound signal. Alternatively or additionally, the at least one propagation quantity is indicative of a time-of-flight of the ultrasound signals through the medium.

In the context of the present disclosure, a propagation time of an ultrasound signal may refer to a value of the time-of-flight of the respective ultrasound signal. Hence, the propagation time can correspond to a propagation value and the time-of-flight can correspond to a propagation quantity in the context of the present disclosure.

As set out hereinabove, the medium may, for example, comprise at least two components and/or substances which are to be mixed. As a sound velocity in the at least two components may differ, the propagation time of an ultrasound signal may depend on the volume of each of the at least two components traversed by the respective ultrasound signal. Likewise, the propagation time, e.g. time-of-flight, may depend on a path length and/or portions of the overall or total path length the respective ultrasound signal has travelled through each of the components. In other words, as the sound velocities of the at least two components, e.g. at least two fluids, that are mixed may differ from another, the propagation time of each of the ultrasound signals may depend on the partition, share and/or ratio of the at least two components traversed by the respective ultrasound signal. As a mixing process continues, a relative share of the path lengths and/or portions of the total path length of the ultrasound signal through each of the components may vary in time, e.g. caused by stirring an inhomogeneous medium which gets increasingly homogenous over time.

Accordingly, determining the propagation time for each of the ultrasound signals and determining the at least one fluctuation value correlating with a variance of the determined propagation times allows one to reliably and accurately determine the mixing state, a level of homogeneity and/or a level of inhomogeneity of the medium.

To determine the propagation time for each of the ultrasound signals, a time period between emission and reception of the respective ultrasound signal may be determined. For example, the controller may trigger emission of an ultrasound signal at a first instant of time. The controller may further be configured to detect reception of the ultrasound signal at a second instant of time, wherein the propagation time may be given as the time period between the first and the second instant of time.

According to an embodiment, the step of determining the at least one propagation value for each of the plurality of received ultrasound signals comprises determining an attenuation value, e.g. an amplitude attenuation value, for each of the plurality of ultrasound signals, the attenuation value being indicative of an attenuation of the respective ultrasound signal by the medium. Alternatively or additionally, the at least one propagation quantity is indicative of an attenuation of the ultrasound signals by the medium.

The attenuation and/or amplitude attenuation of an ultrasound signal by the at least two components and/or substances of the medium to be mixed may differ, e.g. depending on a density of the at least two components. In other words, the attenuation value may be indicative of a damping of the respective ultrasound signal by the medium. Accordingly, also the attenuation values of each of the ultrasound signals may provide information about the relative share of the path lengths and/or portions of the total path length, each of the ultrasound signals has traversed each of the at least two components. Accordingly, determining the attenuation value for each of the ultrasound signals and determining the at least one fluctuation value correlating with a variance of the attenuation values allows one to reliably and accurately determine the mixing state, i.e. a level of homogeneity and/or a level of inhomogeneity.

In the context of the present disclosure, an attenuation value of an ultrasound signal may refer to a value of the attenuation of the respective ultrasound signal. Hence, the attenuation value can correspond to a propagation value and the attenuation can correspond to a propagation quantity in the context of the present disclosure.

It should be noted that for each or at least a subset of the ultrasound signals the propagation time and the attenuation value may be determined. In other words, for each or at least a subset of the ultrasound signals, a first propagation value corresponding to the propagation time and a second propagation value corresponding to the attenuation value may be determined. Accordingly, a first fluctuation value may be determined based on the determined propagation times of at least two of the plurality of ultrasound signals and a second fluctuation value may be determined based on the attenuation values of at least two of the plurality of ultrasound signals. This may allow for a plausibility check of the determination of the mixing state based on of the first and the second fluctuation values. Also, a precision and/or accuracy of the determination of the mixing state may be increased. An additional option is the calculation of cross-correlation. Other possible measurement values could for example be the phase between sender and receiver, the distortion of the wave pattern, or the envelope shape of received wave and its properties.

According to an embodiment, the method further comprises comparing the determined at least one fluctuation value with a threshold value, wherein the threshold value may be indicative of a certain and/or predetermined level of homogeneity of the medium. Optionally, the method may further comprise triggering a control signal, e.g. by the controller, if the threshold value is reached. The control signal may then, for example, be used to stop and/or terminate the mixing process.

According to an embodiment, determining the at least one fluctuation value comprises determining a relative variance and/or a relative variance value of the determined propagation values with respect to a reference value. Alternatively or additionally, the at least one fluctuation quantity comprises a relative variance of the determined propagation values with respect to a reference value. Generally, the relative variance of the propagation values may provide a reliable measure for determining and/or estimating the mixing state, the homogeneity (or inhomogeneity), a level of homogeneity (or inhomogeneity), and/or a status of the mixing process.

Generally, the relative variance (and/or relative variance value) may be defined as an expectation and/or expectation value of a squared deviation of the propagation values with respect to the reference value. In other words, the relative variance may refer to a second order statistical moment for the propagation values with respect to the reference value.

According to an embodiment, determining the at least one fluctuation value comprises determining a statistical moment with an order of two, preferably at least three for the propagation values with respect to a reference value. Generally, statistical moments with an order of three or more may allow to precisely determine the mixing state.

According to an embodiment, determining the at least one fluctuation value comprises determining a Fourier transform for the determined propagation values. The at least one value of the at least one fluctuation quantity may then be determined based on the Fourier transform of at least two of the determined propagation values. Therein, the Fourier transform may, for instance, refer to a Fast Fourier transform. The Fourier transform may be determined e.g. by the controller. Generally, transforming the propagation values into frequency space and/or dividing the propagation values into frequency components by means of Fourier transformation may allow to comprehensively and efficiently analyze the propagation values in terms of the frequencies or frequency components.

According to an embodiment, the reference value is an average value of the propagation quantity and/or an average value of the propagation values of the propagation quantity. Alternatively or additionally, the reference value is an expectation value of the propagation quantity and/or of the propagation the values. Generally, however, an arbitrary value of the propagation quantity may be used as reference value.

According to an embodiment, at least two of the plurality of ultrasound signals are transmitted at least partly through the medium at different times. Accordingly, the at least two ultrasound signals may also be received at different times. However, depending on the propagation times of the ultrasound signals through the medium, the at least two ultrasound signals may be transmitted through the medium at different times, but received simultaneously. By way of example, one of the at least two ultrasound signals may be transmitted at a first instant of time and the other one of the at least two ultrasound signals may be transmitted at a second instant of time, which differs from the first instant of time. By transmitting at least two ultrasound signals at different times through the medium, the two ultrasound signals may be affected differently by the medium, e.g. as they may traverse different volumes and/or parts of the medium, for example if the medium is stirred and/or rotates. Accordingly, determining the at least one fluctuation value based on the propagation values of the at least two ultrasound signals transmitted at different times, may allow to increase a precision and reliability of the determination of the overall mixing state and/or homogeneity of the medium. In addition, it may allow for the reconstruction of spatial information of the mixing state.

According to an embodiment, at least two of the plurality of ultrasound signals are transmitted at least partly through the medium along at least partly differing paths. Accordingly, the at least two ultrasound signals may traverse different volumes and/or parts of the medium. Hence, the at least one fluctuation value determined based on the at least two ultrasound signals transmitted along at least partly differing paths may allow to reliably determine the mixing state and/or level of homogeneity of the medium.

By way of example, a plurality of ultrasound devices may be arranged along a circumference of the container and/or may be spaced apart from each other along a circumferential direction of the container. This may ensure that ultrasound signals emitted from different ultrasound devices traverse the medium along at least partly differing paths. The differing paths, however, may optionally intersect each other. Also, when ultrasound signals are transmitted by a single ultrasound device at different times, the respective ultrasound signals may traverse the medium along different paths, e.g. due to movements of the medium that may, for example, be caused by stirring the medium.

According to an embodiment, at least one of the plurality of received ultrasound signals is received after reflection on a container wall, e.g. an inner wall, of the container. By way of example, at least one ultrasound device may be arranged inside the container, e.g. on an inner wall of the container, wherein the ultrasound device may be configured to emit an ultrasound signal in direction of the medium and to receive the ultrasound signal after it has traversed the medium at least partly and after it has been reflected on the container wall.

According to an embodiment, the ultrasound signals or the plurality of ultrasound signals are transmitted at least partly through the medium in a sequence of time, wherein the method further comprises a step of determining a time series of the determined propagation values of the ultrasound signals of the plurality of ultrasound signals. In other words, the propagation quantity may be determined as a function of time based on the time series of the propagation values.

According to an embodiment, the method further comprises:

determining a time period between at least two extrema, e.g. at least two consecutive extrema, of the time series of the propagation values; and determining a rotational speed of the medium, a rotation frequency and/or a rotation rate, at which the medium rotates, based on the determined time period between the at least two extrema, e.g. at least two consecutive extrema, of the time series of the propagation values.

When the medium is stirred, at least a part of the medium may rotate at a certain rotational speed, a certain rotation frequency and/or a certain rotation rate. Accordingly, propagation values determined for ultrasound signals that traversed the medium at different times and/or along different paths through medium may be periodically modulated according and/or corresponding to the rotational movement of the medium. Hence, the propagation values and/or the propagation quantity may periodically vary in time and/or oscillate between extremal values and/or between extrema. Generally, the at least two extrema may refer to a maximum and/or a minimum. Therefore, a time period between at least two extrema, such as e.g. at least two consecutive extrema, allows to determine the rotational speed, the rotation frequency and/or the rotation rate. Hence, based on the propagation values, the time series of the propagation values and/or the propagation quantity as a function of time, additional information about the medium as well as about the mixing process can be determined.

According to an embodiment, the method further comprises:

determining a first fluctuation value of the at least one fluctuation quantity for a first subset of the plurality of ultrasound signals transmitted at least partly through the medium during a first time period and/or received during a first time period;

determining a second fluctuation value of the at least one fluctuation quantity for a second subset of the plurality of ultrasound signals transmitted at least partly through the medium during a second time period and/or received during a second time period, wherein the second time period differs at least partly from the first time period; and determining the mixing state of the medium based on comparing the first fluctuation value with the second fluctuation value.

Generally, as a level of homogeneity of the medium increases over time, e.g. due to mixing and/or stirring of the medium, the fluctuation quantity, which correlates with the variance of the determined propagation values, may decrease over time. Accordingly, comparing the first fluctuation value determined for ultrasound signals traversing the medium during the first time period and the second fluctuation value determined for ultrasound signals traversing the medium during the second time may provide a clear indication and/or signature for the mixing state of the medium and/or for the level of homogeneity of the medium.

According to a second aspect, there is provided a program element and/or a computer program, which, when executed by a controller (and/or a processor of the controller) of a measurement system, instructs the measurement system to perform the method, as described above and in the following.

According to a third aspect, there is provided a non-transitory computer-readable medium storing a program element, which, when executed by a controller (and/or a processor of the controller) of a measurement system, instructs the measurement system to perform the method, as described above and in the following.

According to a fourth aspect, there is provided a measurement system configured to perform the method, as described above and in the following. Particularly, the measurement system comprises at least one ultrasound device configured to emit and receive ultrasound signals, and a controller.

Therein, the controller may be configured to determine at least one propagation value of at least one propagation quantity for each ultrasound signal received by the at least one ultrasound device, e.g. based on processing the ultrasound signal received by the at least one ultrasound device and/or based on processing an electrical signal provided by the at least one ultrasound device, wherein the electronic signal may be indicative of the received ultrasound signal. Further, the controller may be configured to determine the at least one fluctuation value of the at least one fluctuation quantity based on at least a subset and/or least two of the determined propagation values.

The at least one ultrasound device may comprise at least one ultrasound emitter or transducer and at least one ultrasound receiver, wherein the at least one ultrasound emitter and the at least one ultrasound receiver may be configured to be arranged on opposite sides of a container, such that the container with the medium may be arranged at least partly between them. Alternatively or additionally, the at least one ultrasound device may be configured and/or arranged to receive ultrasound signals after reflection on a container wall of a container.

Further, the measurement system may comprise a plurality of ultrasound devices, wherein the ultrasound devices may be configured to be arranged at different positions on a container, such that ultrasound signals emitted and/or received by the ultrasound devices may traverse the container along propagation paths through the container which at least partly differ from another.

It should be noted that features, functions, elements and/or steps, which are described above and in the following with reference to one aspect of the invention, equally apply to any other aspect of the invention described above and in the following. Particularly, features and/or steps, as described above and in the following with reference to the method according to the first aspect, equally apply the program element according to the second aspect, to the computer-readable medium according to the third aspect, and/or to the measurement system according to the fourth aspect, and vice versa.

In the following, various aspects, details, examples and/or advantages of the present disclosure are summarized. One or more ultrasound devices, e.g. ultrasound transducers, may be arranged and/or attached to a wall of a container or tank. The one or more ultrasound devices may be arranged and/or configured such that an ultrasound signal can be transmitted in a direct path through the medium inside the container. For example, an ultrasound signal may travel from a single emitter to a single receiver of a single ultrasound device. As a sound velocity and/or a velocity of an ultrasound signal in e.g. two components of the medium to be mixed may be different, the time-of-flight and/or propagation time of the ultrasound signal may depend on the partition and/or distribution of the at least two components of the medium along the respective path of the ultrasound signal through the medium. If the sound velocities in each component (e.g. each liquid) of the medium are known (which is rarely the case), one can in principle estimate the share of each component (e.g. each liquid) in and/or along the respective path of the ultrasound signal. Further, the variations and/or the variance of the propagation times and/or the time-of-flight may be an indicator for the homogeneity of the medium. According to the present disclosure, the variance of the propagation times and/or the time of flight for the ultrasound signals over time and/or the relative variance, e.g. to the average propagation time and/or time-of-flight, allows to estimate the amount or level of homogeneity and hence the status of the mixing process.

Furthermore, as the typical time scales of mixing may be known, e.g. depending on fluid motion such as turbulent or laminar, a size of the container, a type of the impeller or the like, and/or random variations due to the measurement process can be distinguished from the variance due to inhomogeneity or homogeneity of the medium. Apart from that, a time correlation and/or other statistical methods may be used alternatively or additionally to the propagation times of the ultrasound signals. Moreover, multiple ultrasound devices may be used to compare e.g. a local liquid partition in different parts of the container. In other words, a measurement of a spatial rather than a temporal variance may be used. Also, one or more ultrasound devices and reflection from e.g. an opposite container wall, and/or the amplitude attenuation, e.g. due to scattering at a liquid-liquid interface, may be used alternatively or additionally to the time of flight and/or the propagation values.

Moreover, if the components of the medium are immiscible and have different densities, the corresponding sound speeds may be determined separately before the mixing process starts. Hence, e.g. a maximum variation expected can be determined.

Also, acoustic scattering from particles, e.g. colloids, suspended in the medium may be measured. The particles may be excited e.g. on a side of the container and scattered signals may be received through the bottom of the container or the other way around. Further, besides mixing of two components (e.g. liquid phases), a dispersion of particles in a fluid may also be determined. Also, the acoustic attenuation (similar to the sound speed) will depend on the material These and other aspects of the invention will be apparent from and elucidated with reference to the embodiments described hereinafter.

In the following, the invention is described with reference to the appended figures which give background explanations and represent exemplary embodiments of the invention. The scope of the invention is, however, not limited to the specific features disclosed in the context of the figures.

The figures are schematic only and not true to scale. In principle, identical or like parts, elements and/or steps are provided with identical or like reference symbols in the figures.

Figure 1A:
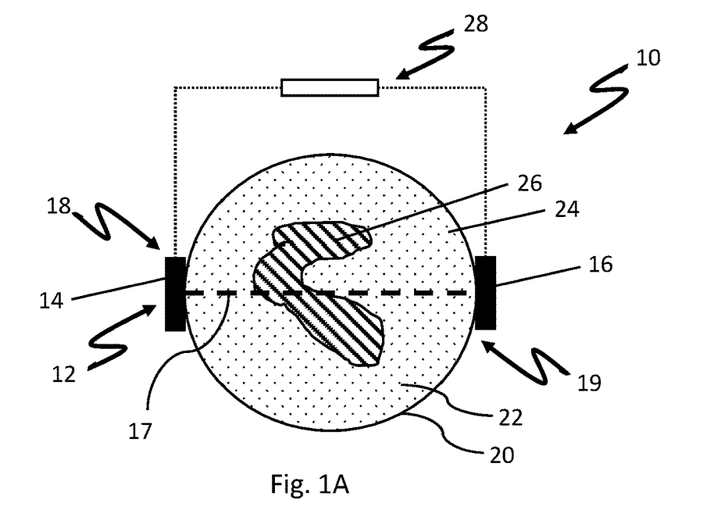
FIG. 1A shows a measurement system according to an exemplary embodiment of the invention.
Figure 1B:
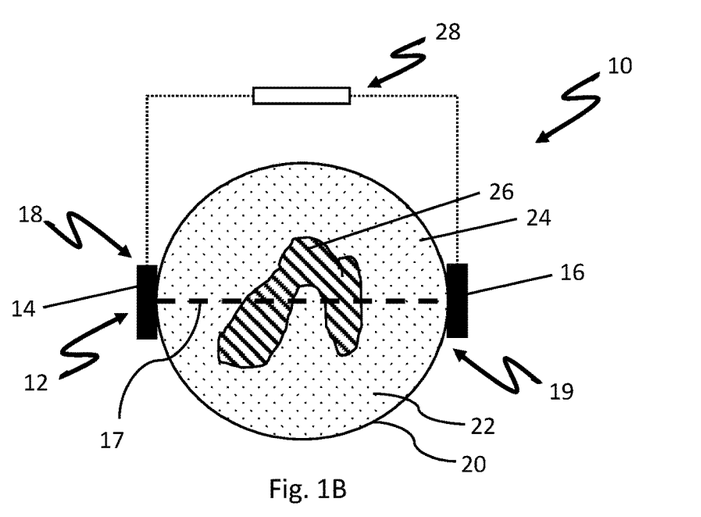
FIG. 1B shows the measurement system of FIG. 1A after a rotation of the medium of about 90 degrees.
Figure 1C:
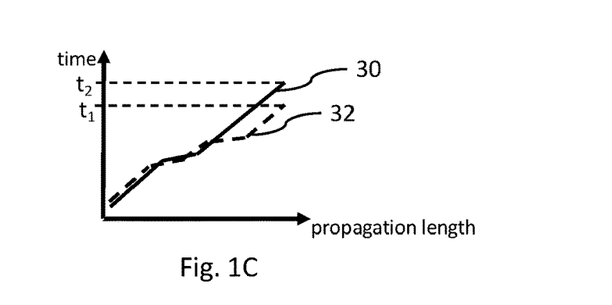
FIG. 1C illustrates a time behavior of ultrasound signals transmitted through the medium and received by the measurement system of FIGS. 1A and 1B.

FIG. 1A shows a measurement system 10 according to an exemplary embodiment of the invention. FIG. 1B shows the measurement system 10 of FIG. 1A after a rotation of the medium of about 90 degrees with respect to FIG. 1A. FIG. 1C illustrates a time behavior of ultrasound signals transmitted through the medium and received by the measurement system 10 of FIGS. 1A and 1B.

The measurement system 10 comprises an ultrasound device 12, ultrasound transmitter 12 and/or an ultrasound transducer 12. The ultrasound device 12 comprises at least one ultrasound sender 14, ultrasound emitter 14 and/or sender 14 and at least one ultrasound receiver 16 and/or receiver 16. Therein, the ultrasound sender 14 is arranged on a first side 18 and/or at a first position 18 of a container 20, and the ultrasound receiver 16 is arranged on a second side 19 and/or at a second position 19 of a container 20 opposite to the first side 18 and/or the first position 19. For instance, the ultrasound device 12 may comprise one or more piezoelectric elements, in short also called piezos, glued to a plastic substrate that can be attached to the outer container wall.

The container 20 comprises a medium 22 and/or mixture 22 comprising at least two different components 24, 26, materials 24, 26 and/or substances 24, 26 to be mixed. The at least two components 24, 26 may differ e.g. in material composition, density, physical properties and/or chemical properties. One or more of the components 24, 26 may be liquids, fluids, gases and/or solid materials.

In the context of the present disclosure, a mixing state of the at least two components 24, 26 and/or of the medium 22 can be determined, as described in detail hereinabove and in the following. Likewise, a mixing process of the at least two components 24, 26 and/or the medium 22 may be monitored. However, the present disclosure is not limited to such application. Another exemplary application may e.g. be a monitoring of dissolving of powder in a fluid and/or liquid.

The measurement system 10 further comprises a controller 28 coupled to the ultrasound device 12, coupled to the ultrasound sender 14 and/or coupled to the ultrasound receiver 16.

It should be noted that the measurement system 10 with the container 20 and/or the medium 22 may be regarded as a measurement arrangement for determining a mixing state of the medium 22.

The ultrasound sender 14 is arranged and/or configured to emit ultrasound signals in direction of the container 20 and/or the medium 22, such that the ultrasound signals travel through at least a part of the medium 22 and/or traverse the medium 22 at least partly along a propagation path 17 and/or path 17. Further, the ultrasound receiver 16 is arranged and/or configured to receive ultrasound signals emitted by the ultrasound sender 14 after the ultrasound signals at least partly traversed the container 20 and/or the medium 22.

The controller 28 may be configured to trigger emission of an ultrasound signal by the ultrasound sender 14. Accordingly, the controller 28 may be configured to determine a time instant, an instant of time and/or a time at which an ultrasound signal is emitted by the ultrasound sender 14.

Further, the controller 28 may be configured to determine a time instant, an instant of time and/or a time at which the ultrasound signal is received by the ultrasound receiver 16. The controller 28 may be further configured to determine a propagation time of the ultrasound signals, wherein the propagation time may refer to and/or be indicative of a time-of-flight of the ultrasound signal between emission by the sender 14 and reception by the receiver 16. For this purpose, reception of the ultrasound signal may be indicated by the receiver 16 to the controller 28, e.g. based on providing a reception signal to the controller 28.

Alternatively, or additionally, the controller 28 may be configured to e.g. determine an attenuation value for an ultrasound signal received by the receiver 16. By way of example, the attenuation value may be determined based on comparing an amplitude of the ultrasound signal which was sent by the sender 14 with an amplitude of the ultrasound signal received by the receiver 16. Based on this comparison, the controller 28 may determine the attenuation value of said ultrasound signal.

As illustrated in FIGS. 1A and 1B, the medium 22 may be an inhomogeneous mixture of the at least two components 24, 26. Therein, the components 24, 26 and/or the medium 22 may refer to an inhomogeneous distribution of the components 24, 26, e.g. two liquid phases, in the container 20, which may be mixed, e.g. by an impeller arranged in the container 20. During the mixing process, the medium 22 rotates and the components 24, 26 may change shape, particularly the component 26, until full mixing of the two components 24, 26 is achieved. In FIG. 1B the distribution of the two components 24, 26 is shown, as an example, after a rotation by about 90 degrees with respect to the distribution of the two components 24, 26 shown in FIG. 1A. Evidently, after rotation, the path and/or propagation path 17 of ultrasound signals emitted by the sender 14 is distributed differently between and/or with respect to the two components 24, 26. Accordingly, a time-of-flight and/or amplitude of the ultrasound signals emitted by the sender 14 and traversing the medium 22 varies in time due to the rotation of the medium 22. Particularly, portions of the overall propagation path 17 an ultrasound signal traverses and/or travels through the components 24, 26, respectively, in the distribution of the medium 22 shown in FIG. 1A differ from the respective portions of the overall propagation path 17 in the distribution of the medium 22 shown in FIG. 1B. In other words, the propagation paths 17 shown in FIGS. 1A and 1B through the medium 22 differ from another. Accordingly, a propagation time of an ultrasound signal traversing the medium 22 in the distribution of the medium 22 of FIG. 1A differs from a propagation time of an ultrasound signal traversing the medium 22 in the distribution of the medium 22 of FIG. 1B. Hence, the propagation times of the two ultrasound signals differ and/or vary between the distributions of the medium 22 of FIGS. 1A and 1B due to the different velocities of the ultrasound signal in component 24 and component 26, respectively. By way of example, for water and alcohol the velocities of an ultrasound signal are about 1480 m/s and 1170 m/s, respectively. Such fluctuation and/or variation of the propagation times of the two ultrasound signals traversing the medium 22 along the respective propagation paths 17 shown in FIG. 1A and FIG. 1B, respectively, indicates that the distribution of the medium 22 and/or the two components 24, 26 is inhomogeneous and that the mixing process is not yet finished.

This effect is illustrated in FIG. 1C, which shows the time behavior of ultrasound signals transmitted and received by the measurement system 10 of FIGS. 1A and 1B. Particularly, FIG. 1C shows the time an ultrasound signal travels as a function of the propagation length between the sender 14 and the emitter 16. In other words, FIG. 1C illustrates a propagation speed of the ultrasound signals through the medium 22.

The solid line 30 in FIG. 1C illustrates an ultrasound signal traversing the medium 22 along the propagation path 17 through the distribution of the components 24, 26 shown in FIG. 1A, whereas the dashed line 32 illustrates an ultrasound signal traversing the medium 22 along the propagation path 17 through the distribution of the components 24, 26 shown in FIG. 1B. In this example, the velocity of the ultrasound signals in the component 26 may be larger than the velocity in component 24. As the ultrasound signal illustrated by the solid line 30 in FIG. 1C (corresponding to the propagation path 17 of FIG. 1A) traverses a larger amount or volume of the component 24, the propagation time $t_2$ of this ultrasound signal is longer than the propagation $t_1$ of the ultrasound signal illustrated by the dashed line 32 in FIG. 1C (corresponding to the propagation path 17 of FIG. 1B). Accordingly, the time difference between the propagation times $t_1$ and $t_2$ as well as the variance of the propagation times $t_1$ and $t_2$, e.g. with respect to a reference value, provides an indicator for the mixing state and/or the homogeneity of the medium 22.

To determine the mixing state and/or the homogeneity of the medium 22, the controller 28 is configured to determine for each of the ultrasound signals emitted in FIGS. 1A and 1B, respectively, the corresponding propagation times $t_1$ and $t_2$, which are referred to as propagation values in the context of the present disclosure. Therein, the propagation times are indicative of the time-of-flight, which is referred to as propagation quantity in the context of the present disclosure.

Further, the controller 28 is configured to determine, as a fluctuation value, a value of the variance and/or of the relative variance of the determined propagation times $t_1$ and $t_2$, wherein the variance and/or the relative variance is referred to as fluctuation quantity in the context of the present disclosure. The value of the relative variance may e.g. be determined with respect to a reference value, such as e.g. an average propagation time and/or an expectation value of the propagation time (and/or time-of-flight).

Alternatively or additionally, the controller 28 may be configured to determine an attenuation value for each of the ultrasound signals and determine a value of the variance and/or relative variance of the attenuation values, e.g. with respect to an average attenuation value or attenuation.

It should be noted that instead of or in addition to the ultrasound device 12 with a sender 14 and receiver 16 arranged opposite to each other, as shown in FIGS. 1A and 1B, at least one ultrasound device 12 configured to detect ultrasound signals after reflection from the opposite wall of the container 20 can be used. Also, multiple ultrasound devices 12 may be arranged along a circumference of the container 20 and/or multiple ultrasound devices 12 may be vertically spaced apart from each other and distributed vertically on the container 20, e.g. for measuring and/or correlating the density in different layers of the medium 22.

Also, transition times and inversion algorithms may be used to determine a tomographic image of a density distribution of the medium 22, e.g. along and/or in a cross section of the container 20.

Furthermore, alternatively or additionally to the value of the variance of the propagation times, a path-based variance may be used to characterize and/or determine the mixing state of the medium 22, wherein e.g. the propagation times for different paths 17 with the same lengths may be compared.

Apart from that, it should be noted that other statistical measures than the variance of the propagation times can be used in an analogue way. For instance, statistical moments with an order of at least three and/or functions thereof, characteristics of an autocorrelation function, spectral characteristics, and/or Fourier transforms of the propagation values may be used.

Moreover, reflections at the boundaries between different phases and/or between boundaries of the at least two components 24, 26 of the medium 22 may lead to a large scatter and/or variance of propagation times and/or arrival times for ultrasound signals reflected at such boundaries. Hence, such large variances may be used to determine the mixing state, e.g. based on comparing a determined variance value of the propagation times with a threshold value.

Alternatively or additionally, variances, values of the variance and/or changes in the attenuation of the ultrasound signals, which may mainly be caused by scattering of parts of the ultrasound signal away from the transmission region, may be used to determine the mixing state of the medium 22.

The measurement system 10 may be configured to sequentially transmit and/or receive a plurality of ultrasound signals. Accordingly, the ultrasound signals may be transmitted and/or received in a sequence of time. The controller 28 may further be configured to determine, for at least a subset of the received ultrasound signals, preferably for each received ultrasound signal, a propagation time. Accordingly, the controller 28 may be configured to determine a time series of the propagation times and/or a time series of propagation values of another propagation quantity, such as e.g. the attenuation.

Figure 2:
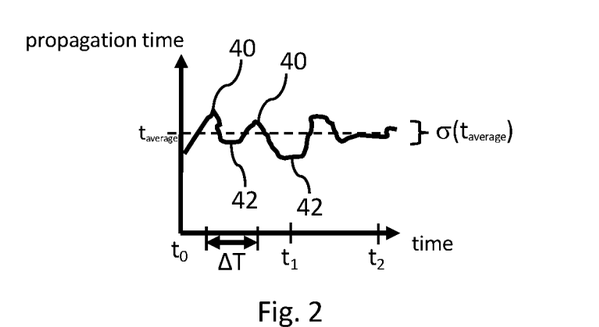
FIG. 2 shows the propagation time of ultrasound signals as a function of time to illustrate steps of the method of determining a mixing state according to an exemplary embodiment of the invention.

Such exemplary time series of the propagation times is shown in FIG. 2. Particularly, FIG. 2 shows the propagation time (in arbitrary units) of ultrasound signals as a function of time (in arbitrary units) to illustrate steps of the method of determining a mixing state according to an exemplary embodiment of the invention.

As can be seen in FIG. 2, the determined propagation times (and/or the corresponding propagation quantity, i.e. the time-of-flight) are fluctuating in time and/or over the mixing time around an average propagation time and/or an average time-of-flight $t_{-average}$.

The controller 28 is configured to determine at least one value of the relative variance $\sigma(t_{-average})$ of the propagation times with respect to a reference value, e.g. the average propagation time $t_{-average}$. The relative variance of the propagation times and/or a statistical quantity correlating with this fluctuation quantity can serve as an indicator for a level of homogeneity of the medium 22 and/or can be used to characterize the mixing state of the medium 22 and/or the mixing process.

By way of example, the controller 28 may determine that the medium 22 is sufficiently mixed and/or sufficiently homogenous based on comparing the determined value of the relative variance $\sigma(t_{-average})$ of the propagation times with a threshold value. If the value of the relative variance $\sigma(t_{-average})$ reaches and/or falls below this threshold value, the medium 22 may be sufficiently mixed and/or sufficiently homogenous.

Optionally, the controller 28 may be configured to generate a control signal in response to determining that the value of the relative variance $\sigma(t_{-average})$ has reached and/or fallen below the threshold value, wherein the control signal may be used to terminate the mixing process, e.g. by stopping an impeller based on the control signal.

Moreover, the controller 28 can be configured to determine a first value of the relative variance $\sigma_1$ for a first subset of propagation times determined for ultrasound signals transmitted and/or received during a first time period, e.g. between $t_0$ to $t_1$ in FIG. 2, and to determine a second value of the relative variance $\sigma_2$ for a second subset of propagation times determined for ultrasound signals transmitted and/or received during a second time period, e.g. between $t_0$ to $t_2$ or $t_1$ to $t_2$ in FIG. 2. Generally, with increasing homogeneity of the medium 22, the relative variance of the propagation times is expected to decrease. Hence, the mixing state of the medium 22 may be determined by the controller 28 based on comparing the first value $\sigma_1$ and the second value $\sigma_2$ of the relative variance.

It should be noted that the propagation times shown in FIG. 2 are not entirely independent, but rather correlate with each other. This allows to derive further information from the time series of the propagation times. For instance, the controller 28 can be configured to determine at least two extrema 40, 42 of the time series and to determine a time period $\Delta T$ and/or correlation between at least two extrema 40, 42. The time period $\Delta T$ may e.g. be determined between two consecutive maxima 40, between two consecutive minima 42, and/or between consecutive maxima 40 and minima 42. Based on the determined time period $\Delta T$, the controller 28 may determine a rotational speed of the medium 22, at which the medium 22 rotates, e.g. due to a stirring by the impeller. The controller 28 may also control a rotational speed of the medium 22 based on controlling the impeller.

Figure 3:
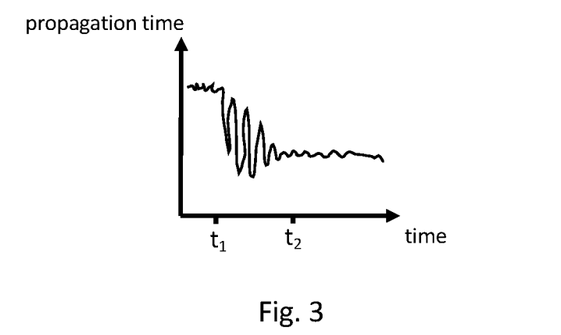
FIG. 3 shows the propagation time of ultrasound signals as a function of time to illustrate steps of the method of determining a mixing state according to an exemplary embodiment of the invention.

FIG. 3 shows the propagation time (in arbitrary units) of ultrasound signals as a function of time (in arbitrary units) to illustrate steps of the method of determining a mixing state according to an exemplary embodiment of the invention, analogue to FIG. 2.

Specifically, FIG. 3 illustrates a time series of propagation times, wherein at time $t_1$ a further component, e.g. another liquid such as a sugar solution, is added to the medium 22. The further component may be added at a specific location of the container 20 and/or cross section thereof. After adding the further component at time $t_1$, the propagation times oscillate between time $t_1$ and time $t_2$. Accordingly, also the relative variance of the propagation times increases, which may be determined by the controller 28 to determine the mixing state of the medium 22, as described in detail hereinabove.

Optionally, the controller 28 may determine the oscillation period between time $t_1$ and time $t_2$, which may allow to determine the rotational speed and/or a rotation frequency of the medium 22.

During the mixing processes and/or with increasing mixing time, the oscillation gets smaller and the liquid distribution gets more homogeneous. Hence, also the relative variance decreases, which may be used to determine the mixing state, as described above.

Further, when the medium 22 is homogenously mixed, i.e. after time $t_2$, the propagation times oscillate around a new average propagation time, thereby indicating that a homogeneous mixture the medium 22 is established.

Figure 4:
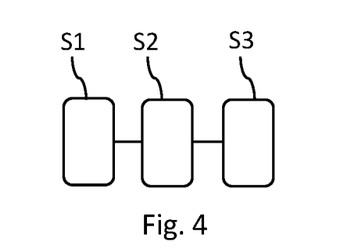
FIG. 4 shows a flowchart illustrating steps of a method of determining a mixing state according to an exemplary embodiment of the invention.

FIG. 4 shows a flowchart illustrating steps of a method of determining a mixing state, e.g. by means of a measurement system 10 as described hereinabove, according to an exemplary embodiment of the invention.

Step S1 comprises transmitting a plurality of ultrasound signals at least partly through the medium 22 and receiving the plurality of ultrasound signals after at least partly traversing the medium 22, e.g. with the at least one ultrasound device 12 of the measurement system 10.

Step S2 comprises determining, e.g. with the controller 28, at least one propagation value of at least one propagation quantity for each of the plurality of received ultrasound signals, wherein the propagation quantity is indicative of an interaction of the ultrasound signals with the medium 22. In step S2, e.g. a propagation time and/or an attenuation value may be determined for each of the plurality of received ultrasound signals.

Step S3 comprises determining, e.g. with the controller 28, at least one fluctuation value of at least one fluctuation quantity based on at least a subset, e.g. at least two, of the determined propagation values, wherein the at least one fluctuation quantity is indicative of and/or correlates with a variance of the at least subset of the determined propagation values. In step S3, e.g. at least one value of the relative variance of the propagation times and/or at least one value of the relative variance of the attenuation values may be determined.

The at least one fluctuation value determined in step S3 may serve as an indicator for a level of homogeneity of the medium 22 and/or may serve to characterize the mixing state of the medium 22, as described in detail hereinabove. Accordingly, in step S3 the mixing state of the medium 22 is determined based on the at least one fluctuation value.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of determining a mixing state of a medium in a container, the method comprising the steps of:
    transmitting a plurality of acoustic signals at least partly through the medium and receiving the plurality of acoustic signals after at least partly traversing the medium;
    determining at least one propagation value of at least one propagation quantity for each of the plurality of received acoustic signals to provide determined propagation values, each at least one propagation quantity being indicative of an interaction of the acoustic signals with the medium, wherein the acoustic signals are transmitted at least partly through the medium in a sequence of time;
    determining at least one fluctuation value of at least one fluctuation quantity based on the determined propagation values to provide a determined at least one fluctuation value, each at least one fluctuation quantity being indicative of and/or correlating with a variance of the determined propagation values and/or with a state of a mixture;
    determining the mixing state of the medium based on the determined at least one fluctuation value, the mixing state being indicative of a homogeneity the medium;
    determining a time series of the determined propagation values of the acoustic signals;
    determining a time period between at least two extrema of the time series of the propagation values; and
    determining a rotational speed of the medium, at which the medium rotates, based on the determined time period between the at least two extrema of the time series of the propagation values.

2. The method according to claim 1, wherein determining the at least one propagation value for each of the plurality of received acoustic signals comprises determining a propagation time for each of the plurality of acoustic signals, the propagation time being indicative of a time-of-flight of the respective acoustic signal through the medium.

3. The method according to claim 1, wherein determining the at least one propagation value for each of the plurality of received acoustic signals comprises determining an attenuation value for each of the plurality of acoustic signals, the attenuation value being indicative of an attenuation of the respective acoustic signal by the medium.

4. The method according to claim 1, wherein determining the at least one fluctuation value comprises determining a relative variance of the determined propagation values with respect to a reference value.

5. The method according to claim 1, wherein determining the at least one fluctuation value comprises determining a statistical moment with an order of at least three for the propagation values with respect to a reference value, and/or
    wherein determining the at least one fluctuation value comprises determining a Fourier transform for the determined propagation values.

6. The method according to claim 4, wherein the reference value is an average value of the propagation quantity, and/or
    wherein the reference value is an expectation value of the propagation quantity.

7. The method according to claim 1, wherein at least two of the plurality of acoustic signals are transmitted at least partly through the medium at different times.

8. The method according to claim 1, wherein at least two of the plurality of acoustic signals are transmitted at least partly through the medium along at least partly differing paths.

9. The method according to claim 1, wherein at least one of the plurality of received acoustic signals is received after reflection on a container wall of the container.

10. The method according to claim 1, further comprising:
    determining a first fluctuation value of the at least one fluctuation quantity for a first subset of the plurality of acoustic signals transmitted at least partly through the medium during a first time period;
    determining a second fluctuation value of the at least one fluctuation quantity for a second subset of the plurality of acoustic signals transmitted at least partly through the medium during a second time period, the second time period at least partly differing from the first time period; and
    determining the mixing state of the medium based on comparing the first fluctuation value with the second fluctuation value.

11. A program element, which, when executed by a controller of a measurement system, instructs the measurement system to perform the method according to claim 1.

12. A non-transitory computer-readable medium storing the program element according to claim 11.

13. A measurement system configured to perform the method according claim 1, the measurement system comprising:
    at least one ultrasound device configured to emit and receive acoustic signals; and
    a controller.

14. The method according to claim 1, wherein the acoustic signals comprise ultrasound signals.

* * * * *